United States Patent
Someya

[15] 3,661,445
[45] May 9, 1972

[54] ZOOM LENS SYSTEM

[72] Inventor: Atsushi Someya, Tokyo, Japan
[73] Assignee: Canon Kabushiki Kaisha, Tokyo, Japan
[22] Filed: June 29, 1970
[21] Appl. No.: 50,675

[30] Foreign Application Priority Data
July 12, 1969 Japan..................................44/54834

[52] U.S. Cl..............................................350/186, 350/184
[51] Int. Cl................G02b 15/18, G02b 15/16, G02b 15/14
[58] Field of Search..........................................350/184, 186

[56] References Cited

UNITED STATES PATENTS

| | | |
|---|---|---|
| 3,320,014 | 5/1967 | Macher..................................350/184 |
| 3,348,899 | 10/1967 | Price..................................350/184 |
| 3,030,863 | 4/1962 | Schwartz et al.......................350/184 |

*Primary Examiner*—David Schonberg
*Assistant Examiner*—Paul A. Sacher
*Attorney*—Joseph M. Fitzpatrick

[57] ABSTRACT

The zoom lens system of this invention is capable of extreme close-up photography, and consists mainly of a focusing lens group having positive refractive power and a negative refractive power variator. The variator is divided into a positive refractive power lens group and a negative refractive power lens group. In phototaking from the infinity to a normal distance, said focusing lens group is shifted for focusing and for focusing a subject located closer than said normal distance, the variator is held in telephoto position and then the positive refractive power lens group of the variator is shifted forward for focusing.

2 Claims, 7 Drawing Figures

ZOOM LENS SYSTEM

This invention relates to a zoom lens system which is capable of extreme close-up photography.

In the conventional zoom lens system, the whole or a part of the front lens group is moved for close-up photography.

However, for extreme-close-up photography, the aperture or diameter of the focusing lens group must be remarkably increased so that the correction of optical aberrations becomes extremely difficult. In the conventional zoom lens system, the closest focus is generally of the order of 1,000 mm and a close-up lens or the like must be attached for photography of a subject closer than this distance.

The present invention is therefore concerned to a zoom lens system which can eliminate the defects as described above and can make an extreme-close-up photography without using any close-up lens attachment.

The present invention provides a zoom lens system comprising a positive refractive power lens group and a negative refractive power variator lens group arranged in this order, in which said negative variator lens group comprises a positive and negative refractive power lens groups arranged in this order so that in zooming, both of said positive and negative lens groups are shifted while the distance therebetween remains unchanged, thereby varying a focal length; in photography from the infinity to a normal distance, said focusing lens group is shifted for focusing; and for focusing a subject located closer than said normal distance, said variator lens group is once held in telephoto position and then said positive lens group of said variator lens group is shifted forward for focusing.

Figure 1:
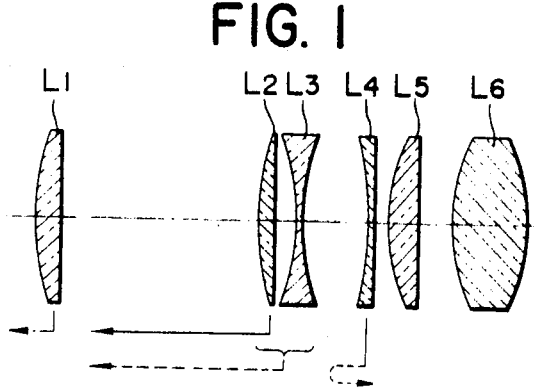
FIG. 1 is a diagrammatic view illustrating the principle of the zoom lens system in accordance with the present invention.

Referring now to FIG. 1, $L_1$ is a focusing lens having positive refractive power; $L_2$ is a lens having positive refractive power and $L_3$ is a lens having negative refractive power and the lenses $L_2$ and $L_3$ comprising as a whole a variator lens group having negative refractive power; $L_4$ is a compensator lens for compensating the position of the focal point; and $L_5$ and $L_6$ form a relay lens group. In a zooming operation, the variator lens group $L_2$, $L_3$ is moved in the direction indicated by the broken arrow while the relative distance between the lenses $L_2$ and $L_3$ remains unchanged, thereby varying the focal length of the whole zooming lens system. In focusing from infinity to a normal phototaking distance, the focusing lens $L_1$ is shifted in the direction indicated by the arrow.

On the other hand, in case of more close-up photography in accordance with the present invention, the variator lens group is once held in telephoto position and then only the positive refractive power lens $L_2$ is shifted forward as shown by the solid arrow for focusing.

In case of the zoom lens system in which the positive refractive power focusing lens and the negative refractive power variator lens group are arranged in this order, the photo-taking magnification is increased when the negative refractive power variator lens group is shifted backward. It is therefore most advantageous for extreme-close-up photography to move the variator lens group to its backmost position in order to obtain the largest magnification. The present invention not only utilizes this principle but also is based upon the effective constitution that the negative refractive power variator lens group is made of the positive and negative lenses as discussed hereinabove, so that after the negative variator lens group $L_2$, $L_3$ as a whole is shifted to the backmost position, the positive front lens is shifted forward for extreme-close-up focusing.

The reason why such extreme-close-up photography with large magnification is possible in accordance with the present invention will be described in more detail hereinafter with reference to FIG. 3.

Figure 3:
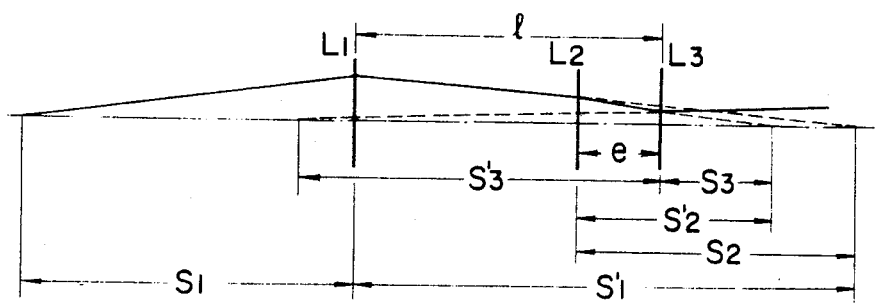
FIG. 3 is for explanation of image focusing in the zoom lens system depicted in FIG. 1.

In FIG. 3, $S_1$, $S_2$ and $S_3$ and $S_1'$, $S_2'$ and $S_3'$ designate the distances between the objects and images formed by the lenses $L_1$, $L_2$ and $L_3$ respectively; $e$, the distance between the principal points of the lenses $L_2$ and $L_3$; $l$, the distance between the principal points of the lenses $L_1$ and $L_3$; and $f_1$, $f_2$ and $f_3$, the focal lengths of the lenses $L_1$, $L_2$ and $L_3$ respectively.

Assuming that the magnification obtained by the lenses $L_1$, $L_2$ and $L_3$ be $M$, the following relations may be held:

$$S'_1 = -(e+f_2-l) - \frac{f_2^2}{e-f_2+S_3} \quad (1)$$

$$M = \frac{S'_3-f_3}{f_1 f_2 f_3}\{e^2 + (S_3+f_1-l)e - (f_1-l)(f_2-S_3) + f_2 S_3\} \quad (2)$$

Figure 4:
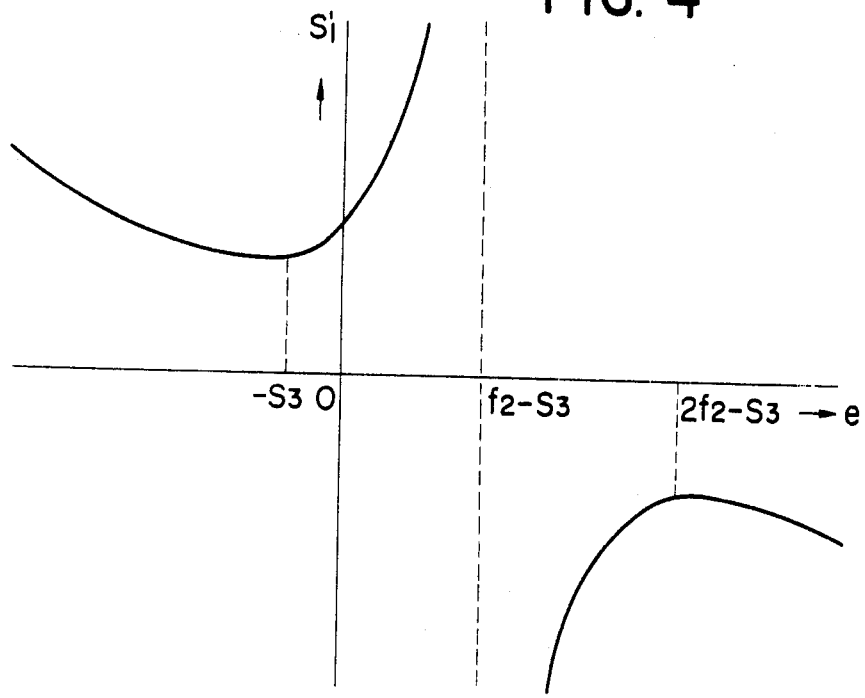
FIG. 4 is a graph illustrating the relationship between a distance between the principal points of the front and back lens groups of the variator lens groups of the zoom lens system in accordance with the present invention and a final image point.
Figure 5:
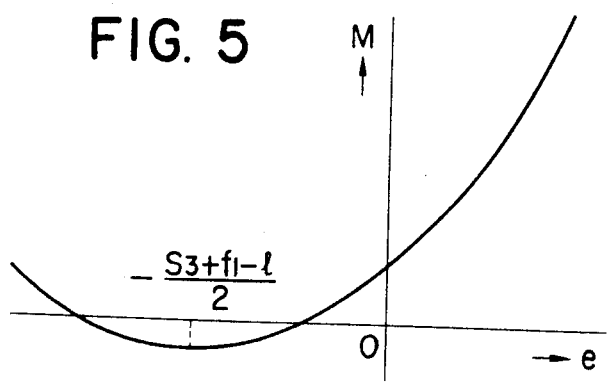
FIG. 5 is a graph illustrating the relationship between the distance of said principal points and a magnification.

The above equations are plotted as shown in FIGS. 4 and 5. To simplify the discussion, we assume that $e = 0$ when the lenses $L_2$ and $L_3$ are moved toward each other most closely. From FIG. 4, it will be seen that $S_1'$ is increased as $e$ is increased from 0 to a positive value, and $S_1'$ becomes finally infinity. In this case, $S_1 = -f_1$. When $e$ is further increased, the value of $S_1'$ becomes negative and within the focal length $L_1$. Until $e = 2f_2 - S_3$, it is possible to decrease the value of $|S_1|$. In this case, when the focal length $L_2$ is so determined as to satisfy the relation $$f_2 \leq \frac{1}{2}(l+S_3),$$

focusing becomes possible until $S_1 = 0$.

The quadratic equation (2) may be rewritten as below:

$$M = A\{e^2 + Be + C\} \quad (3)$$

where $$A = \frac{S'_3 - f_3}{f_1 f_2 f_3}$$

$$B = S_3 + f_1 - l$$

and $$C = f_2 S_3 - (f_1-l)(f_2-S_3)$$

Hence, $$dM/de = A(2e+B) \quad (4)$$

Since $A > 0$ and the value of $e$ which gives the minimum value $$e = -(B/2) < 0,$$ and therefore, $dM/de > 0$ for all of the values of $e > 0$. That is, the magnification value $M$ is increased as $e$ is increased.

The discriminant of Eq. (3)

$$D = B^2 - 4C > 0$$

so that $M$ is positive or negative. However, in the present invention, $M$ must be positive. Therefore, in order to effectively increase $M$ within the range of $e > 0$, the value of $C$ must be selected as to satisfy $C \geq 0$.

As shown in FIG. 5, $M$ is always positive for $e > 0$ and increases in a very effective manner.

PRIOR ART

Figure 2:
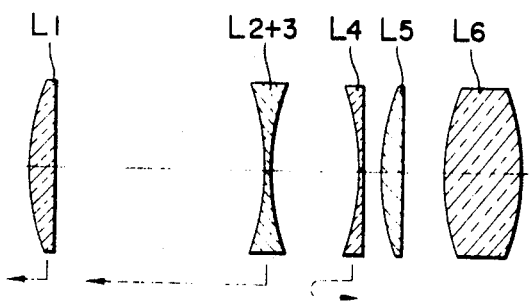
FIG. 2 is a view similar to FIG. 1 illustrating that of conventional zoom lens system.

The conventional zoom lens in illustrated in FIG. 2, in which the positive refractive power focusing lens $L_1$, the negative refractive power variator lens group $L_{2+3}$, the compensator lens $L_4$ and the relay lens group $L_5$ and $L_6$ are arranged in this order. For focusing at a relatively short distance, only the lens $L_1$ is shifted forward. When this zoom system is compared with the present invention, $e$ becomes constant and $l$ becomes the distance between the principal points of the lens groups $L_1$ and $L_{2+3}$, respectively, so that Eqs. (1) and (2) become $$S'_1 = l + S_2 \quad (5)$$

$$M = \frac{S'_{2+3} - f_2}{f_1 f_{2+3}} (l + S_{2+3} - f_1) \quad (6)$$

where $S_{2+3}$ = distance between the object and the lens group $L_{2+3}$;
$S'_{2+3}$ = distance between the image and this lens group; and
$f_{2+3}$ = focal length of this lens group.

Figure 6:
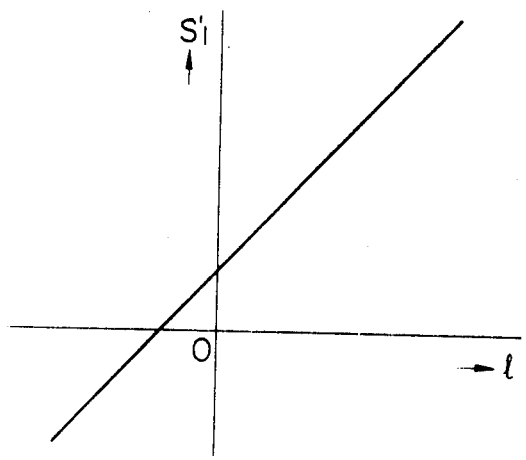
FIG. 6 is a graph illustrating the relationship between a final point and a shift of the variator lens group of the conventional zoom lens system from the end of telephoto position.
Figure 7:
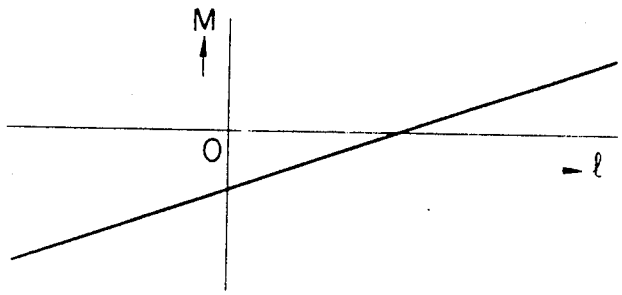
FIG. 7 is a graph illustrating the relationship between a magnification and said shift.

Equations (5) and (6) are plotted as shown in FIGS. 6 and 7. It is seen that both of $S_1'$ and $M$ increase linearly as $l$ increases.

Therefore, the conventional zoom lens system is remarkably inferior to the system of the present invention in which $S_1'$ and $M$ vary quadratically.

The data of one example of the zoom lens system in accordance with the present invention is shown in Table I. The zoom lens is for Cine cameras with a zoom ratio of 8:1 and a compound focal length of 58 mm. In the table $e$ denotes the distance between the principal points of the adjacent lens groups at its telephotoposition having the focal lengths $f$.

TABLE I

| Lenses | Focal length $f$ | $e$ |
|---|---|---|
| 1 | 68.691 | |
| 2 | 100.0 | 40.848 |
| 3 | -13.244 | 5.0 |
| 4 | -38.541 | 12.522 |
| 5 | 31.094 | 5.591 |
| 6 | 26.578 | 36.741 |
| | Compound focal length = 58 | |

The lenses $L_1$ and $L_2$ are shifted by 5.0 and 35.0 mm respectively, and then
Magnification through lenses $L_1$ through $L_3 = 1.61$
Magnification through lenses $L_1$ through $L_6 = -0.47$
Distance between the subject and the first lens groups $S_1 = -137.5$
$M = 0.000545 \, (e^2 + 34.622 + 192.9877)$
$S_1' = -(e + 49.152) - (10,000/e - 83.221)$ The example of the conventional zoom lens illustrated in FIG. 2 is shown in Table II.

TABLE II

| L | $f$ | $e$ |
|---|---|---|
| 1 | 68.691 | |
| 2+3 | -16.2 | 46.963 |
| 4 | -38.541 | 11.712 |
| 5 | 31.094 | 5.591 |
| 6 | 26.578 | 36.741 |
| | Compound focal length = 58 mm | |

When the first lens $L_1$ is shifted by 5.0 mm, then magnification through $L_1$ and $L_{2+3}$ $M = 0.21$
magnification through $L_1 - L_6$ $m = -0.061$
distance between the subject and the first lens $S_1 = -1,012.4$
$M = 0.0427 \quad (l - 46.963)$
$S_1' = l + 21.728$ From the above comparison, the extreme-close-up photography hitherto unobtainable by the conventional zoom lens system is now possible by the zoom lens of the present invention with a greater magnification. Furthermore, the zoom lens of the present invention is similar in size to the conventional zoom lens system.

What is claimed is:

1. In a zoom lens system, a focusing lens component having a positive refractive power, a variator lens component having a negative refractive power, a compensator lens component for compensating focal point position, and a relay lens component, said variator lens component comprising a positive refractive power lens and a negative refractive power lens, the focusing lens component being shiftable toward an object to be photographed and the positive refractive power lens and the negative refractive power lens of the variator lens component being shiftable as a unit toward the object, while the distance between the positive and the negative lenses remains unchanged to provide focusing from infinity to a normal phototaking distance and said positive lens of the variator lens component being shiftable by itself further toward the object for focusing from said normal phototaking distance to an extreme close-up distance.

2. A zoom lens system according to claim 1, wherein there is maintained the following relationships:

$$S'_1 = -(e + f_2 - l) - \frac{f_2^2}{e - f_2 + S_3}$$

and $$M = \frac{S_3' - f_3}{f_1 f_2 f_3} \{ e^2 + (S_3 + f_1 - l)e - (f_1 - l)(f_2 - S_3) + f_2 S_3 \}$$

$S_1$, $S_2$ and $S_3$ and $S_1'$, $S_2'$ and $S_3'$ being the distances between the objects and images formed by the focusing lens ($L_1$), the positive refractive power lens ($L_2$) and the negative refractive power lens ($L_3$), respectively, $e$ being the distance between the principal points of the lens groups $L_2$ and $L_3$, $l$ being the distance between the principal points of the lens groups $L_1$ and $L_3$, $f_1$, $f_2$ and $f_3$ being the focal lengths of the lenses $L_1$ $L_2$ and $L_3$, respectively, and $M$ being the magnification obtained by the lenses $L_1$, $L_2$ and $L_3$.

* * * * *